United States Patent Office 2,874,144
Patented Feb. 17, 1959

2,874,144

POLYPERFLUOROCHLOROETHYLENE AND LEAD DIOXIDE

William E. Hanford, Short Hills, N. J., assignor, by mesne assignments, to Minnesota Mining and Manufacturing Company, St. Paul, Minn., a corporation of Delaware No Drawing. Application April 20, 1955
Serial No. 502,719

4 Claims. (Cl. 260—45.75)

This invention relates to the treatment of perfluorochloroolefin polymers. In one aspect, the invention to the stabilization of polymers of trifluorochloroethylene. In another aspect, the invention relates to a method for improving heat aging characteristics of thermoplastic polymers of trifluorochloroethylene.

Polymers of trifluorochloroethylene are prepared by the polymerization of the monomer, trifluorochloroethylene. The preparation of monomeric trifluorochloroethylene may be accomplished by various methods. One method comprises dechlorinating trifluorotrichloroethane, commercially available as Freon 113, under suitable conditions of dechlorination in the presence of a suitable solvent, such as methyl alcohol, with a dehalogenating agent, such as zinc dust, to produce an effluent comprising the monomer, unreacted trifluorotrichloroethane and solvent. Another method comprises dechlorinating trifluorotrichloroethane by passing said material over a catalyst selected from the group IB and group VIII metals, and combinations thereof, in the presence of hydrogen, at a temperature above about 200° C. The effluent obtained from either of the above outlined processes is then passed to a suitable fractional distillation system in which substantially pure trifluorochloroethylene is recovered. It is usually preferred to conduct distillations in the presence of a terpene compound at a temperature above about 25° C. since this treatment removes impurities which are detrimental to the production of high molecular weight polymers. The terpene treatment step may be conducted with the first distillation step or at any convenient time prior to the introduction of the monomer into the polymerization zone.

The monomer, obtained as described above, is polymerized under suitable polymerization conditions with or without the presence of a suitable catalyst or promoter. Such conditions may comprise the use of a suitable catalyst, such as bis-trichloroacetyl peroxide, dissolved in a suitable solvent such as trichlorofluoromethane at a temperature between about −20° C. and about 50° C. An additional polymerization process employing substantially the same conditions as described above may be used. In this process a different type of polymerization reactor is employed and the polymer is formed as a suspension in the monomer and is recovered therefrom by evaporation.

The polymer produced by either of the above described processes is characterized by wholly different chemical and physical characteristics than otherwise similar but non-fluorinated polymeric materials. The chemical resistance of polymers of trifluorochloroethylene is such, that they will withstand exposure to a wide variety of oxidizing, reducing and solvent-type materials, such as fuming nitric acid, concentrated sulfuric acid, hydrazine, hydrogen peroxide, acetone, aniline, etc. Physically, the thermo plastic polymers possess high heat stability, tensile strength, etc. In addition to the above, the thermoplastic polymers are readily molded into various useful articles, such as valves, gaskets, etc. using standard equipment but with modified operating conditions.

However, when polymers of trifluorochloroethylene are maintained at elevated temperatures for prolonged periods of time, degradation occurs. This degradation is, in reality, a thermal cracking of the polymer chain with a consequent reduction in molecular weight of the polymer and is evidenced, in the case of thermoplastic polymers, by a reduction in the ZST of the polymer. Unfortunately, molding temperatures so closely approach the degradation temperature that under ordinary conditions it is extremely difficult to mold the polymer without some degradation, however slight.

It is an object of this invention to provide a process for improving the thermal stability of perfluorochloroolefin polymers.

It is another object of this invention to provide a means for stabilizing polymers of trifluorochloroethylene.

It is one of the more particular objects of this invention to improve the thermal stability of polymers of trifluorochloroethylene.

It is another of the particular aspects of this invention to provide a means for molding polymers of trifluorochloroethylene at temperatures approaching decomposition temperature.

Various other objects and advantages of the present invention will become apparent to those skilled in the art on reading the accompanying description and disclosure.

Generally, the above objects are accomplished by admixing with, and intimately dispersing within the polymer a quantity of lead dioxide which functions as a stabilizing agent and improves the thermal stability of the perfluorochloroolefin polymers and particularly the polymers of trifluorochloroethylene.

Stabilization of the polymer is effected by admixing with, and intimately dispersing within the polymer between about 0.05 and about 20 parts of lead dioxide per 100 parts of polymer by weight, and preferably between about 0.1 and about 10 parts of lead dioxide per 100 parts of the polymer. The exact concentration of the stabilizing agent employed, will be determined by the use for which the polymer is intended. Thus, when the polymer is to be used as a molding powder, it is preferred to use between about 0.1 and about 3 parts of the stabilizing agent per 100 parts of polymer, whereas when used in the form of a dispersion, for example, in xylene, diisobutyl ketone, amyl acetate, water, acetone, etc., it is preferred to use between about 3 and about 7 parts of lead dioxide per 100 parts of polymer.

The polymers which are particularly suited to the process of this invention are the high molecular weight, normally solid thermoplastic polymers. Since the determination of molecular weight of the perfluorochloroolefin polymers, such as polymers of trifluorochloroethylene, is tedious and expensive, it has become an accepted practice to express the molecular weight of the polymer in terms of its ZST value which is dependent on the molecular weight. Thus, homopolymers of trifluorochloroethylene which are particularly suited to the process of this invention, have a ZST value of above about 125.

This invention also contemplates the treatment of copolymers of trifluorochloroethylene containing below about 70 mol percent of fluorine containing olefins, such as perfluorobutadiene, vinylidene fluoride, difluorodichloroethylene, difluoroethylene, trifluoroethylene, perfluorostyrene, perfluorocyclobutene, and phenyltrifluoroethylene. The polymers and copolymers which are to be treated, may contain up to about 25 percent of a fluorinated plasticizer. The fluorinated plasticizers are the lower members of the saturated perfluorochlorocarbon series, for example, polytrifluorochloroethylene in the oil to wax range. The addition of plasticizer to the polymer in some instances, advantageously modifies the characteristics of the polymer, for example, by increasing its pliability, etc.

Admixing of the stabilizing agent with the polymer may be effected in a variety of ways although usually the standard mechanical techniques are preferred. The method to be employed in effecting the admixture is based on the particle size of the polymer and the stabilizing agent. Thus, if both the polymer and stabilizing agent are in finely-divided form, conventional tumbling type mixers, such as a barrel mixer, conical mixer and mushroom mixer may be employed. If the polymer and stabilizing agent are not already finely-divided, then they should be ground in order to secure thorough admixture. Although the grinding of the stabilizing agent and of the polymer may be effected separately, it is preferred that they be ground together since the presence of the stabilizing agent will also retard thermal degradation which is apt to result during the grinding operation. Grinding of the polymer and stabilizing agent may also be effected in conventional equipment such as ball and pebble mills, colloid mills and hammer mills. A particularly suitable piece of grinding equipment is the Mikropulvarizer, a hammer type mill which functions by forcing the material being ground through an appropriate sized screen by means of a hammer action.

For purposes of this invention, the polymer and stabilizing agent are considered as being finely-divided when about 100 percent passes through a #3½ (0.223") sieve. Preferably, at least 95 percent passes through a #7 (0.11") sieve, and still more preferably at least 95 percent passes through a #12 (0.066") sieve. Admixing is more quickly effected and degradation of the polymer during the grinding operation prevented, when the stabilizing agent is in a more finely-divided form initially. Preferably, 100 percent of the stabilizing agent should pass through a #270 (0.0021") sieve, and still more preferably at least 98 percent through a #325 (0.0017") sieve. The sieve sizes given above are in the U. S. standard series, the number in parentheses is the sieve opening in inches.

In a preferred method of operation between about 30 and about 70 percent of finely-divided lead dioxide is dry-blended with the polymer. The dry-blended powder is then put through a Mikropulvarizer fitted with between about a 0.02" and about a 0.2" screen, preferably with a 0.06" screen to insure thorough mixing. The stabilized "concentrate" is then dry-blended with an additional quantity of unstabilized polymer to reduce the concentration of stabilizing agent to the desired level. This finely-divided stabilized polymer powder, has a low apparent density and is suitable for use in certain types of molding operation, such as compression molding. In other types of molding operations, such as extrusion and injection molding, a high density molding powder is preferred. The low density molding powder is converted to a high density powder by passing it through an extruder and a multiplicity of rod dies. A rotating chopper in front of the die cuts the extruded rod into granules of a desired size. To minimize polymer degradation during this operation, the temperature is maintained just high enough to compact the powder into granules without converting them completely into homogeneous pellets.

The low density molding powder may also be prepared for use in a dispersion. Conversion of the low density powder to a dispersion grade powder is effected by grinding in a suitable mill, such as a ball mill, to reduce the particle size to the extent that about 98 percent will pass through a #270 sieve preferably through a #325 sieve. The higher concentration of stabilizing agent which is used with dispersion grade polymers serves to further retard degradation of the polymer during the prolonged grinding operation and also serves to retard degradation during use since dispersion grade polymer is usually used in the form of thin films which are more subject to high temperature effects. After grinding to the desired particle size, the stabilized polymer is then admixed with a suitable vehicle. Suitable vehicles are those which are generally known as "lacquer thinners" such as xylene, acetone, di-isobutyl ketone, etc. A particularly suitable vehicle is a mixture of xylene and di-isobutyl ketone. In applications where solvents are objectionable, aqueous-dispersions may be used. Usually, between about 10 and about 30 percent of the stabilized polymer is added to the vehicle depending on the method of application of the dispersion. Generally, higher concentrations of polymer are used when a dispersion is to be applied by dip or brush techniques, whereas spray techniques usually require a lower solids concentration.

Molding of the low or high density stabilized powder can be accomplished by using suitable molding equipment at temperatures between about 415° F. and 625° F. and a pressure between about 500 and about 25,000 pounds per square inch. Detailed description of preferred molding processes may be found in U. S. Patents Nos. 2,617,149, 2,617,150, 2,617,151, and 2,617,152 issued November 11, 1952, to Louis C. Rubin. When used in the form of a dispersion, the polymer contained in a suitable vehicle such as a mixture of xylene and di-isobutyl ketone is applied by spray, brush or dip techniques, and is air-dried or heat-dried at a temperature up to about 302° F. after which it is fused at a temperature between about 464° F. and about 482° F. for a period of time between about one hour and about 24 hours, preferably about 12 hours to insure the production of a homogeneous film of high tensile strength. When the stabilized polymer of this invention is fabricated by any of the above described processes, a homogeneous polymer mass is produced which contains, intimately dispersed within its mass, the added stabilizing agent.

As indicated previously, when perfluorochloroolefin polymers are maintained at elevated temperatures for prolonged periods of time (for example during molding), the polymer chain is cracked, thereby reducing the molecular weight of the polymer. Since determination of molecular weights is a tedious process, an empirical test, which tends to reflect the molecular weight of the sample under test, is used. In this test, the ZST value of the polymer is determined. Briefly, determination of the ZST value is carried out by molding a test strip 0.062"±0.003" thick, 2" long, and 9/16" wide. This strip is then notched at the center. The cross-section of the specimen at the notch is 0.047±0.001" wide by 0.062±0.003". The upper portion of the strip is held in position with a spring clip while a weighted spring clip totaling 7½ grams is attached to the other end of the specimen. The weighted specimen is then maintained at a temperature of about 300° C. in a suitable apparatus. The number of seconds required for the sample to break at the notch, is the ZST value. For evaluating the stabilizer of this invention, two ZST values were determined, namely the standard ZST value and the degradation ZST value. The standard ZST value was determined by taking a sample of approximately 40 grams and molding it into a pellet approximately 2" in diameter and 9/16" in thickness, by applying 12,000 p. s. i. pressure without heat. The pellet was then placed between two platens which were set to give a sheet 62 mills in thickness. The platens were then placed in a press, preheated for 3 minutes at about 260° C. without pressure and then heated at about 260° C. for an additional 3 minutes at 20,000 p. s. i. This pressed sheet was removed, cut into a notched ZST strip, and its ZST value determined as described above. The time in seconds required for this strip to break is the standard ZST value. The degradative ZST value was determined by preparing a pellet in the same manner as described for the standard ZST value determination, except that the pellet was preheated in a press at 300° C. for 5 minutes after which the specimen was heated at 300° C. under a pressure of about 20,000 p. s. i. for an additional 5 minutes. This second sheet was cut into a notched ZST strip and its ZST value determined as described above. The time in seconds required to break this strip at the notch, represents the degradative ZST value. For a fuller and more complete understanding of the method and apparatus used in determining ZST values, reference may be had to application Serial No. 432,681, now U. S. Patent No. 2,729,967, filed May 27, 1954, by H. S. Kaufman and C. R. Giannotta.

EXAMPLE I

In order to illustrate the stabilizing effect of lead dioxide, a number of samples were prepared containing lead dioxide in different concentrations. In preparing these samples, the quantity of lead dioxide indicated in the table below was added to an amount of a homopolymer of trifluorochloroethylene sufficient to bring the total sample weight up to 40 grams. The polymer and lead dioxide were then blended in a mortar and pestle for about 5 minutes, after which the blend was molded into standard and degradative ZST strips. The standard and degradative ZST values observed, are reported in the table below.

Table 1

| Lead dioxide, g. | ZST values | |
|---|---|---|
| | Standard | Degradative |
| 0.0 | 427 | 170 |
| 0.2 | 419 | 405 |
| 0.4 | 410 | 423 |

EXAMPLE II

This example presents data illustrating the use of sodium chlorate as an additive to polytrifluorochloroethylene. In determining the ZST values reported below, the same procedure was employed as described above using sodium chlorate as the additive. The homopolymer of trifluorochloroethylene was from the same batch as that used in Example I. The quantity of sodium chlorate indicated in the table, was added to an amount of polymer sufficient to bring the total sample weight up to 40 grams. Standard and degradative ZST test strips were then prepared and the ZST values determined as described above. These values are reported in the table below. From these values it will be observed that some stabilizing effect is obtained. However, each of the samples was badly bubbled and the pressings were non-uniform. Consistent results were not obtained as shown by the runs in which 0.04 and 0.4 gram of sodium chlorate were added. In addition, the degradation products obtained with these additives were corrosive and damaged the metal platens used in pressing the samples.

Table 2

| Sodium chlorate, g. | ZST values | |
|---|---|---|
| | Standard | Degradative |
| 0.04 | 410 | 323 |
| 0.04 | | 329 |
| 0.04 | | 238 |
| 0.04 | | 233 |
| 0.2 | 405 | 333 |
| 0.4 | | 357 |
| 0.4 | 368 | 307 |

Various alterations and modifications of the invention and its aspects may become apparent to those skilled in the art without departing from the scope of this invention.

Having thus described my invention, I claim:

1. A novel plastic composition consisting of an admixture of a homopolymer of trifluorochloroethylene and between about 0.05 and about 20 parts of lead dioxide per 100 parts of said homopolymer, said homopolymer being inert to chemical cross-linking in the presence of lead dioxide.

2. A novel plastic composition for use in a dispersion consisting of an admixture of a homopolymer of trifluorochloroethylene and between about 3 and about 7 parts of lead dioxide per 100 parts of said homopolymer, said homopolymer being inert to chemical cross-linking in the presence of lead dioxide.

3. A novel plastic composition consisting of an admixture of a plastic homopolymer of trifluorochloroethylene and between about 0.1 and about 3 parts of lead dioxide per 100 parts of said homopolymer, said homopolymer being inert to chemical cross-linking in the presence of lead dioxide.

4. A novel plastic composition prepared from a molding powder consisting of a homogeneous trifluorochloroethylene homopolymer mass and intimately dispersed therein between about 0.1 and about 3 parts of lead dioxide per 100 parts of said homopolymer, said homopolymer being inert to chemical cross-linking in the presence of lead dioxide.

References Cited in the file of this patent

UNITED STATES PATENTS

| 2,077,429 | McMahon | Apr. 20, 1937 |
| 2,141,126 | Doolittle | Dec. 20, 1938 |
| 2,493,390 | Chaban | Jan. 3, 1950 |
| 2,507,142 | Chaban | May 9, 1950 |
| 2,563,772 | Cheney | Aug. 7, 1951 |
| 2,643,988 | Walter | June 30, 1953 |
| 2,789,959 | Smith | Apr. 23, 1957 |
| 2,789,960 | Smith | Apr. 23, 1957 |

OTHER REFERENCES

Zapp et al.: Journal of Polymer Science, vol. 9-10, pages 97-113, August 1952.